(No Model.)
A. E. JOHNSON.
Shave for Making Scotch Sole Edges on Boots and Shoes.
No. 234,038. Patented Nov. 2, 1880.
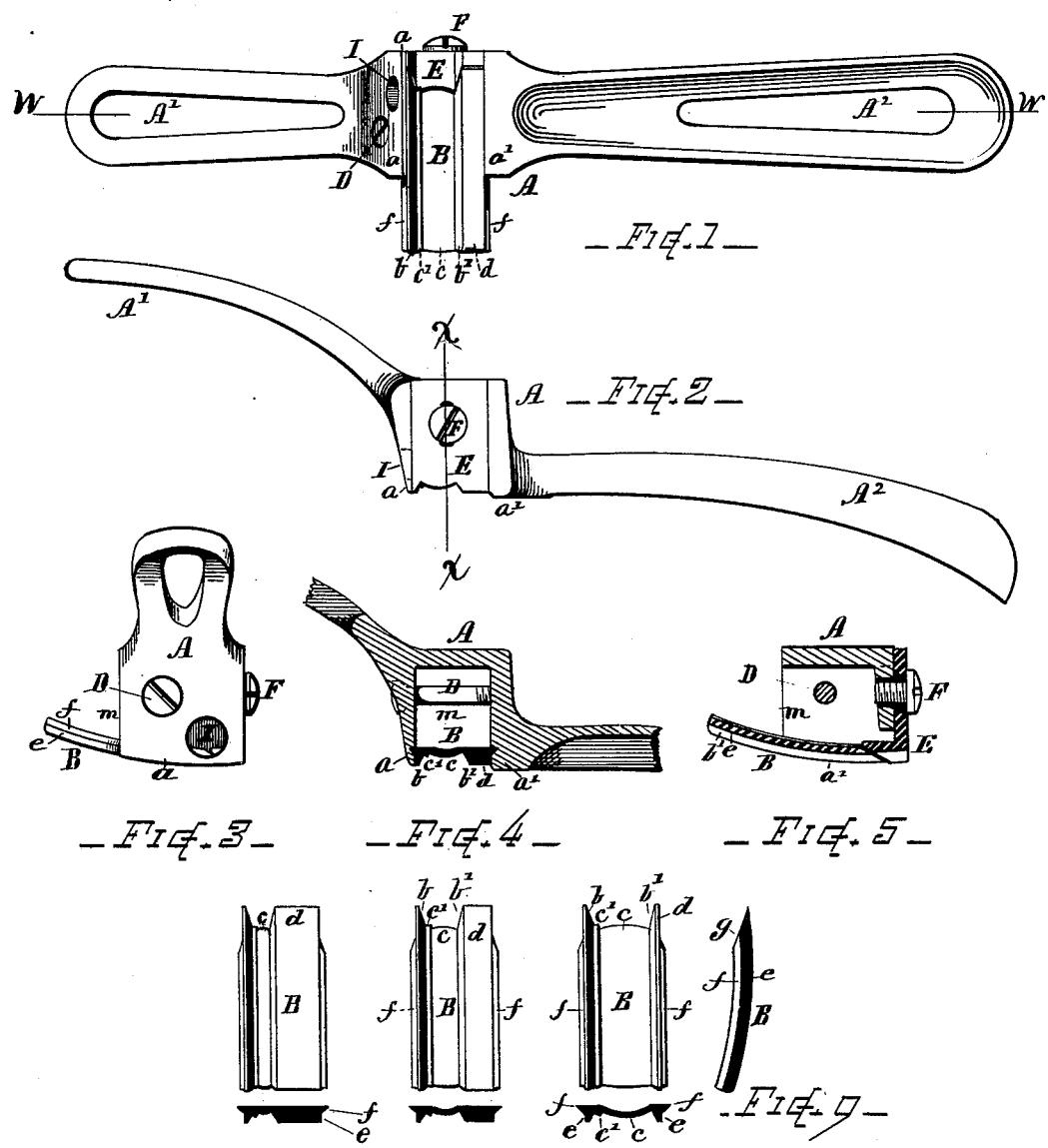
Witnesses
Edward L. Freeman
Geo. M. Rice 2d
Inventor
Albert E. Johnson
By Chas. H. Burleigh
Atty.

UNITED STATES PATENT OFFICE.

ALBERT E. JOHNSON, OF OXFORD, MASSACHUSETTS.

SHAVE FOR MAKING SCOTCH SOLE-EDGES ON BOOTS AND SHOES.

SPECIFICATION forming part of Letters Patent No. 234,038, dated November 2, 1880.

Application filed April 17, 1880. (No model.)

*To all whom it may concern:*

Be it known that I, ALBERT E. JOHNSON, of Oxford, in the county of Worcester and State of Massachusetts, have invented certain new and useful Improvements in Shaves for Making "Scotch" Edges on Boots and Shoes; and I declare the following to be a description of my said invention sufficiently full, clear, and exact to enable others skilled in the art to which it appertains to make and use the same, reference being had to the accompanying drawings, which form a part of this specification.

The object of my invention is to provide a convenient and serviceable shave adapted for making Scotch or molded edges on the soles of boots and shoes, to adapt the said tool for the ready duplication or interchange of blades throughout the series corresponding to and required for various thicknesses of soles, and to improve the construction of the parts, so as to more practically meet the requirements of the work, facilitate the clearance of shavings, and enhance the utility of the tool. I attain these objects by a shave having its parts constructed and arranged as shown in the accompanying drawings, and herein described.

Figure 1 represents a bottom view of my improved shave. Fig. 2 is a front view of the same. Fig. 3 is an end view from the left. Fig. 4 is a longitudinal section at line $w\,w$, Fig. 1. Fig. 5 is a transverse section at line $x\,x$, Fig. 2; and Figs. 6, 7, 8, and 9 are views showing construction of blades.

In the drawings, A denotes the frame of the shave, made with handles A' A² projecting at either side, and arranged in relation thereto substantially as described in my Letters Patent No. 67,313, the handle A' being offset upward, as illustrated, and the frame being slotted to permit sufficient spring for clamping the blade in position.

B denotes the blade, which is made with a molded working-surface having inclined portions $b\,b'$, curved surface $c$, and bead $c'$, corresponding to the shape of Scotch edge desired. Said blade is formed longitudinally to the arc of a circle, and its edges are made with a straight portion, $e$, and an inclined lip or flange, $f$, the latter being along the inner corner of the blade and terminating at the bevel $g$, where the blade is ground off for sharpening.

The lips $f$ fit into the corresponding grooves on the inner part of the frame, as at $a\,a'$, where it is held by clamping the sides $a\,a'$ together by the screw D, the form of the edges $e\,f$ being such as to prevent springing or warping the blade at the thin portions by the clamping pressure.

The series of blades for making the Scotch edges on various thicknesses of soles are all made of a uniform width, thickness, and curvature, and with similar lipped edges $e\,f$, the molded portion being varied in the different blades, the sizes increasing by forty-eighths of an inch from the narrowest to the widest, the balance of the width being filled out by a plain straight fillet, $d$, so that all the blades will fit a single handle or frame and can readily be interchanged or duplicated. A few of the sizes are shown in Figs. 6, 7, and 8, though in practice some sixteen sizes, varying from three forty-eighths to twenty forty-eighths, (more or less,) are required for different classes of work.

The back or reverse side of blades may be concaved out on the larger sizes, as shown in Figs. 7 and 8, if desired.

E indicates the gage-block, made with molded face to correspond with the blades, and with a beveled throat-surface to direct the shaving out through the rear opening, $m$, of the frame A. Said block is secured and adjusted for gaging the thickness of shaving by means of the screw F, in the usual manner.

An opening, I, is formed through the side $a$ at the junction of the blade and gage-block, which serves to permit free clearance for that portion of the shaving cut off by the inclined part $b$ of the blade. This opening I is effective for the perfect working of the tool, although the shavings pass out at the space $m$, since it allows the edge of the shaving to roll outward past the edge of the blade B without crowding against the side of the frame.

It will be observed that the guiding edge or lip at $a$, which runs in the crease between the shoe sole and upper, is continuous and smooth from front to rear, and stands flush or above the corner of the blade, (see Figs. 1 and 3,) so that the point of the blade at $b$ can in no case scratch the upper, no matter at what height the gage-block is adjusted.

I am aware that molded blades have heretofore been used in edge-planes, and I do not therefore herein make claim, broadly, to a molded blade.

What I claim as of my invention, and desire to secure by Letters Patent, is—

1. The blade B, formed as shown, with molded cutting-face $b c' c b'$ and plain portion $d$, and having the projecting inclined lips $f$ and straight surfaces $e$ on its sides, said blade being adapted for use with the handle-frame A, having the grooved sides $a\ a'$ and clearance-space $m$, as hereinbefore set forth.

2. The handle-frame A, made with continuous lip $a$ and opening I, in combination with the cutting-blade B, having a molded face, and the adjustable gage-block E, substantially as and for the purposes set forth.

Witness my hand this 10th day of April, A. D. 1880.

ALBERT E. JOHNSON.

Witnesses:
CHAS. H. BURLEIGH,
S. R. BARTON.